(12) United States Patent
Yamato et al.

(10) Patent No.: US 12,214,577 B2
(45) Date of Patent: Feb. 4, 2025

(54) COMPOSITE STRUCTURE MANUFACTURING METHOD AND COMPOSITE STRUCTURE MANUFACTURING DEVICE

(71) Applicant: MITSUBISHI HEAVY INDUSTRIES, LTD., Tokyo (JP)

(72) Inventors: Homare Yamato, Tokyo (JP); Masahiko Shimizu, Tokyo (JP); Toshiki Kitazawa, Tokyo (JP); Shoya Mano, Tokyo (JP); Akihiro Terasaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 264 days.

(21) Appl. No.: 17/784,268

(22) PCT Filed: Jan. 17, 2020

(86) PCT No.: PCT/JP2020/001561
§ 371 (c)(1),
(2) Date: Jun. 10, 2022

(87) PCT Pub. No.: WO2021/144983
PCT Pub. Date: Jul. 22, 2021

(65) Prior Publication Data
US 2023/0039320 A1    Feb. 9, 2023

(51) Int. Cl.
*B32B 37/10* (2006.01)
*B29C 53/04* (2006.01)
(Continued)

(52) U.S. Cl.
CPC .......... *B32B 37/1036* (2013.01); *B29C 53/04* (2013.01); *B29C 70/30* (2013.01);
(Continued)

(58) Field of Classification Search
None
See application file for complete search history.

(56) References Cited

U.S. PATENT DOCUMENTS

| 6,114,012 A | 9/2000 | Amaoka et al. |
| 6,701,990 B1 | 3/2004 | Burley et al. |
| (Continued) | | |

FOREIGN PATENT DOCUMENTS

| EP | 0141604 A2 | 5/1985 |
| EP | 1126966 A1 | 8/2001 |
| (Continued) | | |

OTHER PUBLICATIONS

Extended European Search Report for European Application No. 20913643.1 mailed Nov. 17, 2022; 7pp.
(Continued)

*Primary Examiner* — Barbara J Musser
(74) *Attorney, Agent, or Firm* — HAUPTMAN HAM, LLP

(57) ABSTRACT

A composite structure manufacturing method comprising: a lamination step in which a plurality of fiber-reinforced resin sheets are laminated to form a plate-shaped laminate; a pressing deformation step in which a third roller or similar, which rolls along a plate surface of the laminate, is used to press the plate surface of the laminate, thereby forming a recessed section or a protruding section in a prescribed section of the laminate; a short direction deformation step in which, after the pressing deformation step, the laminate is deformed in the short direction to make the long direction cross-section into a prescribed shape; and a long direction deformation step in which, after the pressing deformation step, the laminate is deformed in the long direction to make the short direction cross-section into a prescribed shape.

7 Claims, 11 Drawing Sheets

(51) Int. Cl.
  *B29C 70/30* (2006.01)
  *B29C 70/44* (2006.01)
  *B29D 99/00* (2010.01)
  *B32B 5/02* (2006.01)
  *B32B 27/08* (2006.01)

(52) U.S. Cl.
  CPC ........ *B29C 70/446* (2013.01); *B29D 99/0007* (2013.01); *B32B 5/02* (2013.01); *B32B 27/08* (2013.01); *B32B 2309/12* (2013.01)

(56) References Cited

U.S. PATENT DOCUMENTS

| | | |
|---|---|---|
| 9,266,279 B2 | 2/2016 | Benson et al. |
| 9,321,221 B2 | 4/2016 | Aijima et al. |
| 9,440,401 B1 | 9/2016 | Nelson |
| 2010/0024966 A1 | 2/2010 | Felip |
| 2011/0135886 A1 | 6/2011 | Winter et al. |
| 2019/0077048 A1 | 3/2019 | Fujita et al. |
| 2019/0275750 A1 | 9/2019 | Parkinson et al. |
| 2020/0180243 A1 | 6/2020 | Okamoto et al. |

FOREIGN PATENT DOCUMENTS

| | | |
|---|---|---|
| EP | 2018950 A1 | 1/2009 |
| JP | 60112420 A | 6/1985 |
| JP | 10258463 A | 9/1998 |
| JP | 10315339 A | 12/1998 |
| JP | 2006335049 A | 12/2006 |
| JP | 2011528291 A | 11/2011 |
| WO | 2017159567 A1 | 9/2017 |
| WO | 2018220814 A1 | 12/2018 |

OTHER PUBLICATIONS

International Search Report and Written Opinion of International Application No. PCT/JP2020/001561 mailed Mar. 24, 2020; 13pp.

COMPOSITE STRUCTURE MANUFACTURING METHOD AND COMPOSITE STRUCTURE MANUFACTURING DEVICE

RELATED APPLICATIONS

The present application is a National Phase of International Application Number PCT/JP2020/001561 filed Jan. 17, 2020.

TECHNICAL FIELD

The present invention relates to a composite structure manufacturing method and to a composite structure manufacturing device.

BACKGROUND ART

In some structures used in an aircraft, a target shape is obtained by deforming a laminate having a plate shape formed by laminating a plurality of fiber reinforcing resin sheets. A stringer is one of main structures used in the aircraft. The stringer is a long component in which a cross-sectional shape is provided to a cross section of the long component in a longitudinal direction and which is curved or bent in the longitudinal direction. Such a stringer may be manufactured from a laminate in which fiber reinforcing resin sheets are laminated in a plate shape (for example, PTLs 1 to 3). In this case, the laminate having a plate shape needs to have a cross-sectional shape in the longitudinal direction, and to be curved or bent in the longitudinal direction.

PTL 1 discloses a method in which a recess and a projection are formed in a laminate having a flat plate shape using a mandrel having a non-planar surface, and then a cross-sectional shape is provided to a cross section of the laminate in a longitudinal direction.

PTL 2 discloses a method in which a laminate having a flat plate shape is processed to have a cross-sectional shape in a cross section in a longitudinal direction and then, is curved or bent in the longitudinal direction.

PTL 3 discloses a method in which a flat prepreg sheet is deformed using a rotating body such as a roller.

CITATION LIST

Patent Literature

[PTL 1] U.S. Pat. No. 9,440,401
[PTL 2] U.S. Pat. No. 9,321,221
[PTL 3] U.S. Pat. No. 9,266,279

SUMMARY OF INVENTION

Technical Problem

Structures used in an aircraft may have different shapes. In the method of PTL 1, the recess and the projection are formed in the laminate having a flat plate shape using the mandrel. A recess and a projection are provided in the mandrel according to the shape and the like of a structure to be manufactured. For this reason, a mandrel used to manufacture one structure may not be usable for other structures. Therefore, as mandrels as the number of types of structures need to be prepared, and the cost may increase.

In the method of PTL 2, first, the laminate having a plate shape is processed to have a cross-sectional shape in a cross section in the longitudinal direction and then, is curved or bent in the longitudinal direction. In this method, since the cross-sectional shape is initially provided to a cross section of the laminate in the longitudinal direction, when the laminate is curved or bent in the longitudinal direction, a portion having a large radius of curvature and a portion having a small radius of curvature are generated. For this reason, when the laminate is curved or bent in the longitudinal direction, a tensile force acts on the portion having a large radius of curvature, and a compressive force acts on the portion having a small radius of curvature. For this reason, ripples or wrinkles may be generated in the portion having a small radius of curvature, and the strength of the manufactured structure may decrease.

In the method of PTL 3, one prepreg sheet is deformed using the rotating body such as a roller. In the case of manufacturing a structure formed of a laminate having a plate shape formed by laminating a plurality of fiber reinforcing resin sheets by the method of PTL 3, the fiber reinforcing resin sheets are deformed one by one by the rotating body such as a roller and then, the fiber reinforcing resin sheets are laminated. Such a method may increase the time taken to manufacture the structure.

The present invention is conceived in view of such circumstances, and an object of the present invention is to provide a composite structure manufacturing method and a composite structure manufacturing device that are capable of suppressing an increase in cost.

In addition, another object of the present invention is to provide a composite structure manufacturing method and a composite structure manufacturing device that are capable of suppressing the generation of ripples or wrinkles to improve the strength of a composite structure to be manufactured.

In addition, another object of the present invention is to provide a composite structure manufacturing method and a composite structure manufacturing device that are capable of shortening the manufacturing time. Solution to Problem In order to solve the above problems, a composite structure manufacturing method and a composite structure manufacturing device of the present invention adopt the following means.

According to one aspect of the present invention, there is provided a composite structure manufacturing method including: a lamination step of forming a laminate having a plate shape by laminating a plurality of fiber reinforcing resin sheets; a pressing deformation step of forming a recessed portion or a projecting portion in a predetermined portion of the laminate by pressing a plate surface of the laminate with a rotating body that rolls along the plate surface of the laminate; a lateral deformation step of providing a predetermined shape to a cross section of the laminate in a longitudinal direction by deforming the laminate in a lateral direction after the pressing deformation step; and a longitudinal deformation step of providing a predetermined shape to a cross section of the laminate in the lateral direction by deforming the laminate in the longitudinal direction after the pressing deformation step.

In the case of performing deformation in the longitudinal direction and deformation in the lateral direction on the laminate, when the laminate is deformed in the longitudinal direction (namely, when a cross section in the lateral direction is deformed), a portion having a large radius of curvature and a portion having a small radius of curvature are generated depending on the position of a curved or bent portion in the lateral direction. A tensile force acts on the portion having a large radius of curvature in the longitudinal direction, and a compressive force acts on the portion having a small radius of curvature in the longitudinal direction.

In the above configuration, the recessed portion or the projecting portion is formed in the predetermined portion of the laminate before the laminate is deformed in the lateral direction and in the longitudinal direction. When the recessed portion or the projecting portion is formed, the laminate is deformed and elongated by the amount of detour of the recessed portion or the projecting portion. Hence, in a region including the portion in which the recessed portion or the projecting portion is formed, the length of the laminate in the longitudinal direction is lengthened by the amount of detour of the recessed portion or the projecting portion. Therefore, when the laminate is deformed in the longitudinal direction after the recessed portion or the projecting portion is formed, the tensile force generated in the portion having a large radius of curvature is suppressed by an amount by which the length of the laminate in the longitudinal direction is lengthened. Since the tensile force generated in the portion having a large radius of curvature is suppressed, the compressive force acting on the portion having a small radius of curvature is also suppressed. Therefore, the generation of ripples or wrinkles can be suppressed. Hence, the strength of the composite structure can be improved.

In addition, in the above configuration, the recessed portion or the projecting portion is formed in the laminate by the rotating body that rolls on the plate surface of the laminate. Accordingly, for example, the recessed portion or the projecting portion having a desired shape can be formed in the laminate at a desired position by adjusting the position or pressing force of the rotating body. Hence, for example, the cost can be more suppressed as compared to a case where a recessed portion or a projecting portion that wants to be formed is formed in the laminate using a mold prepared according to the position or shape of the recessed portion or the projecting portion.

In addition, in the above configuration, the pressing deformation step, the lateral deformation step, and the longitudinal deformation step are performed on the laminate in which the fiber reinforcing resin sheets are laminated. Accordingly, the time taken to manufacture the composite structure can be more shortened as compared to a case where the pressing deformation step, the lateral deformation step, and the longitudinal deformation step are performed on the fiber reinforcing resin sheets one by one, and then the fiber reinforcing resin sheets are laminated.

Incidentally, the lateral deformation step and the longitudinal deformation step may be performed at the same time.

In addition, in the composite structure manufacturing method according to one aspect of the present invention, the predetermined portion forming the recessed portion or the projecting portion may include a portion to be curved or bent in the longitudinal deformation step.

In the above configuration, the recessed portion or the projecting portion is formed to include the portion to be curved or bent in the longitudinal deformation step. Accordingly, when the laminate is deformed in the longitudinal direction, the tensile force generated in the portion having a large radius of curvature can be more favorably suppressed. Therefore, the compressive force acting on the portion having a small radius of curvature can be suppressed, and the generation of ripples or wrinkles can be more favorably suppressed. Hence, the strength of the composite structure can be more favorably improved.

In addition, in the composite structure manufacturing method according to one aspect of the present invention, in the lamination step, the laminate may be formed such that a length of a region in the longitudinal direction including the predetermined portion forming the recessed portion or the projecting portion in the pressing deformation step is longer than lengths of other regions in the longitudinal direction.

Generally, in order to improve the strength of the laminate, the laminate in which a plurality of fiber reinforcing resin sheets are laminated is formed by laminating the fiber reinforcing resin sheets having different extending directions of fibers. The fiber reinforcing resin sheet is easy to elongate in a direction orthogonal to the fibers, and is difficult to elongate in the extending direction of the fibers. Hence, no matter what direction the laminate is deformed, since the laminate includes a fiber reinforcing resin sheet that is difficult to elongate, the laminate is more difficult to deform than a laminate formed of one fiber reinforcing resin sheet.

Since the laminate is difficult to deform in such a manner, the length of the region in the longitudinal direction including the predetermined portion may not be able to be sufficiently lengthened only by the deformation (elongation) of the laminate. In the above configuration, the laminate is formed such that the length of the region in the longitudinal direction including the predetermined portion forming the recessed portion or the projecting portion in the pressing deformation step is longer than the lengths of the other regions in the longitudinal direction. Accordingly, even when the length of the region in the longitudinal direction including the predetermined portion cannot be sufficiently lengthened only by the deformation (elongation) of the laminate, an insufficient elongation amount can be covered by an amount by which the region is originally formed to be long. Therefore, the length of the region in the longitudinal direction including the predetermined portion can be sufficiently lengthened. Hence, it is possible to favorably suppress the generation of ripples or wrinkles even in the laminate that is difficult to deform.

In addition, in the composite structure manufacturing method according to one aspect of the present invention, in the pressing deformation step, a flexible member may be disposed between the rotating body and the plate surface of the laminate, and the rotating body may press the plate surface of the laminate via the flexible member.

In the above configuration, the rotating body presses the plate surface of the laminate via the flexible member. Accordingly, the flexible member is pressed against the plate surface by a pressing force of the rotating body, and the flexible member is deformed into a shape corresponding to the plate surface. Therefore, the pressing force from the rotating body which acts on the plate surface of the laminate is made uniform. Hence, unintended local deformation can be suppressed.

Incidentally, the flexible member may be a member that covers the plate surface of the laminate, or may be a member that covers the rotating body. Examples of the member that covers the plate surface of the laminate include a flexible film and the like. In addition, examples of the member that covers the rotating body include a track belt and the like.

In addition, in the composite structure manufacturing method according to one aspect of the present invention, the rotating body may be movable in a thickness direction of the laminate.

In the above configuration, the rotating body is moved in the thickness direction of the laminate, so that the laminate can be pressed by the rotating body. Hence, the recessed portion or the projecting portion can be favorably formed in the laminate.

In addition, in the composite structure manufacturing method according to one aspect of the present invention, the rotating body may include a protrusion portion on an outer peripheral surface of the rotating body.

In the above configuration, when the rotating body rolls along the plate surface of the laminate, the protrusion portion presses the plate surface. Accordingly, the recessed portion or the projecting portion can be favorably formed in the laminate.

In addition, in the composite structure manufacturing method according to one aspect of the present invention, in the pressing deformation step, a region adjacent to the recessed portion or to the projecting portion on the laminate may be pressed from both surfaces of the laminate.

In the above configuration, it is possible to suppress the generation of wrinkles caused by the gathering of the fibers in the region adjacent to the recessed portion or to the projecting portion.

According to another aspect of the present invention, there is provided composite structure manufacturing device that is used before a laminate having a plate shape formed by laminating a plurality of fiber reinforcing resin sheets is deformed in a lateral direction to provide a predetermined shape to a cross section of the laminate in a longitudinal direction and before the laminate is deformed in the longitudinal direction to provide a predetermined shape to a cross section of the laminate in the lateral direction, the device including: a rotating body that is rollable along a plate surface of the laminate; and a moving portion that moves the rotating body in a thickness direction of the laminate.

Advantageous Effects of Invention

According to the present invention, an increase in cost can be suppressed. In addition, the generation of ripples or wrinkles is suppressed, so that the strength of the composite structure to be manufactured can be improved. In addition, the manufacturing time can be shortened.

DESCRIPTION OF EMBODIMENTS

Hereinafter, one embodiment of a composite structure manufacturing method and of a composite structure manufacturing device according to the present invention will be described with reference to the drawings.

The composite structure manufacturing method and the composite structure manufacturing device according to the present embodiment are used when a composite structure is manufactured from a laminate 2 having a plate shape which is formed by laminating fiber sheets infiltrated with a resin such as prepregs (hereinafter, referred to as "fiber reinforcing resin sheets"). Examples of the composite structure include a stringer used for a fuselage, a main wing, or the like of an aircraft.

Incidentally, in the following description, a longitudinal direction of the laminate 2 will be described as an X-axis direction, a lateral direction of the laminate 2 will be described as a Y-axis direction, and a thickness direction of the laminate 2 will be described as a Z-axis direction. In the present embodiment, since an example will be described in which the Z-axis direction is an up-down direction, the Z-axis direction may be described as the up-down direction.

Figure 1:
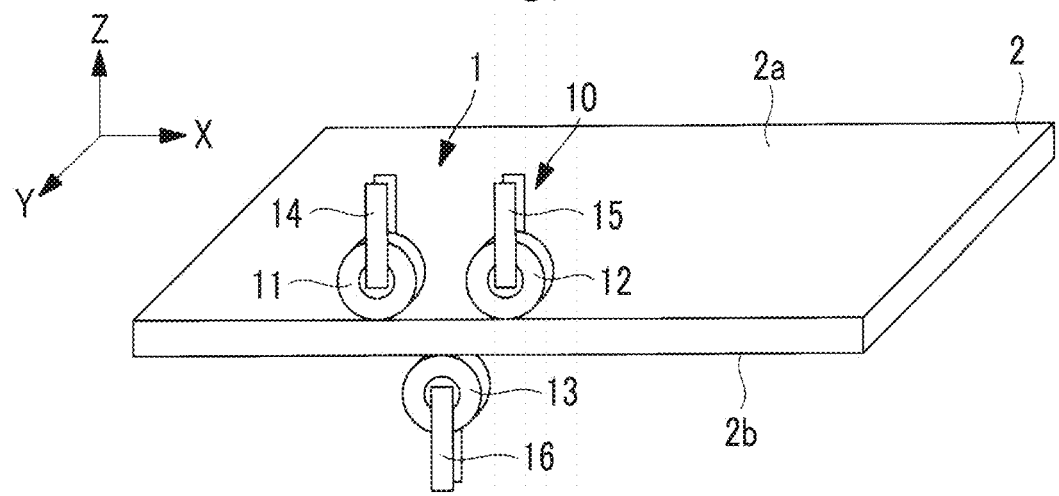
FIG. 1 is a schematic perspective view showing a laminate and rollers according to the present embodiment.

As shown in FIG. 1, the composite structure manufacturing device of the present embodiment (hereinafter, simply referred to as a "recess and projection processing device 1") is a device that performs processing to form a recessed portion or a projecting portion in the laminate 2 having a plate shape which is formed by laminating fiber reinforcing resin sheets that are a composite material. The laminate 2 is formed by laminating fiber reinforcing resin sheets having different fiber extending directions in order to improve the strength of the laminate 2. Namely, in the laminate 2, the extending directions of the fibers forming the laminate 2 are not uniform and are various.

The recess and projection processing device 1 according to the present embodiment includes a first processing device 10 that processes an end portion of the laminate 2 in the lateral direction (Y-axis direction), and a second processing device 20 that processes a central portion of the laminate 2 in the lateral direction. Incidentally, the configuration of the recess and projection processing device 1 is not limited to the example of the present embodiment. For example, only one of the first processing device 10 and the second processing device 20 may be provided. In addition, the recess and projection processing device 1 can move each of the first processing device 10 and the second processing device 20 to an arbitrary position.

First, the first processing device 10 will be described.

As shown in FIG. 1, the first processing device 10 includes a first roller (rotating body) 11 and a second roller (rotating body) 12 that come into contact with an upper surface 2a of the laminate 2, and a third roller (rotating body) 13 that comes into contact with a lower surface 2b of the laminate 2. In addition, the first processing device 10 includes a first moving portion 14 that supports and moves the first roller 11, a second moving portion 15 that supports and moves the second roller 12, a third moving portion 16 that supports and moves the third roller 13, and a control device (not shown) that controls the first moving portion 14, the second moving portion 15, and the third moving portion 16.

Each of the first roller 11, the second roller 12, and the third roller 13 is a rotating body having a cylindrical outer peripheral surface, and rotates around a central axis extending in a direction along a plate surface of the laminate 2 (Y-axis direction in the present embodiment).

The first roller 11 and the second roller 12 are located above the laminate 2. The outer peripheral surfaces of the first roller 11 and the second roller 12 come into contact with the upper surface 2a of the laminate 2, and roll along the upper surface 2a of the laminate 2. The first roller 11 and the second roller 12 are disposed side by side in the X-axis direction.

The third roller 13 is located below the laminate 2. The outer peripheral surface of the third roller 13 comes into contact with the lower surface 2b of the laminate 2 and rolls therealong. The position of the third roller 13 in the Y-axis direction is substantially the same as that of the first roller 11 and the second roller 12. In addition, the position of the third roller 13 in the X-axis direction is located between the first roller 11 and the second roller 12.

The first moving portion 14 moves the first roller 11 in one direction along the X-axis direction using a driving force from a driving source (not shown). The second moving portion 15 moves the second roller 12 in the other direction along the X-axis direction using a driving force from a driving source (not shown). Namely, the second moving portion 15 moves the second roller 12 in a direction opposite to a moving direction of the first roller 11. The third moving portion 16 moves the third roller 13 in the Z-axis direction. Namely, the third moving portion 16 moves the third roller 13 in the up-down direction. In addition, each of the moving portions can fix the corresponding roller so as not to be moved from a predetermined position.

The control device controls the first moving portion 14, the second moving portion 15, and the third moving portion 16 such that the first roller 11, the second roller 12, and the third roller 13 make a predetermined movement. In addition, the control device controls the first moving portion 14, the second moving portion 15, and the third moving portion 16 to adjust movement amounts of the first roller 11, the second roller 12, and the third roller 13.

The control device includes, for example, a central processing unit (CPU), a random access memory (RAM), a read only memory (ROM), a computer-readable storage medium, and the like. Then, as one example, a series of processes for realizing various functions are stored in the storage medium or the like in the form of a program, and the CPU reads the program into the RAM or the like and executes information processing and arithmetic processing, to realize the various functions. Incidentally, a form in which the program is installed in the ROM or another storage medium in advance, a form in which the program is provided in a state where the program is stored in the computer-readable storage medium, a form in which the program is distributed via wired or wireless communication means, and the like may be applied. Examples of the computer-readable storage medium include magnetic disks, magneto-optical disks, CD-ROMs, DVD-ROMs, semiconductor memories, and the like.

Next, a method for forming a recessed portion or a projecting portion in the laminate 2 using the first processing device 10 will be described with reference to FIGS. 2A and 2B.

Figure 2A:
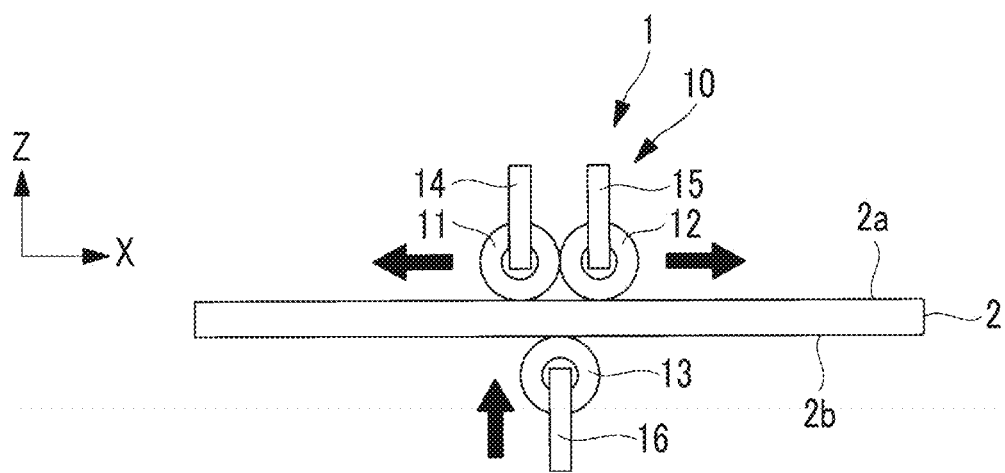
FIG. 2A is a schematic side view showing the laminate and the rollers according to the present embodiment, and is a view showing a method for forming a projecting portion in the laminate.
Figure 2B:
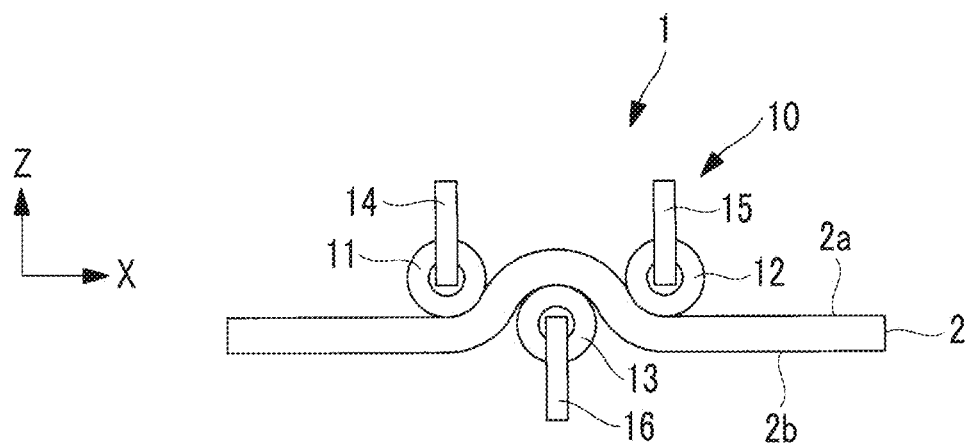
FIG. 2B is a schematic side view showing the laminate and the rollers according to the present embodiment, and is a view showing the method for forming the projecting portion in the laminate.

First, as shown in FIG. 2A, the laminate 2 is inserted into a gap between the third roller 13 and both the first roller 11 and the second roller 12 from the X-axis direction. At this time, the first roller 11 and the second roller 12 are disposed side by side in the X-axis direction to be close to each other or to abut each other. Then, the first roller 11 and the second roller 12 are brought into contact with the upper surface 2a of the laminate 2, and the third roller 13 is brought into contact with the lower surface 2b of the laminate 2. Namely, the laminate 2 is sandwiched between the first roller 11, the second roller 12, and the third roller 13 in the up-down direction. Specifically, the first roller 11, the second roller 12, and the third roller 13 sandwich an end portion of the laminate 2 in the Y-axis direction.

Next, as indicated by arrows in FIG. 2A, the first roller 11 is moved in the one direction of the X-axis direction by the first moving portion 14, and the second roller 12 is moved in the other direction of the X-axis direction by the second moving portion 15. At this time, the first moving portion 14 and the second moving portion 15 move the first roller 11 and the second roller 12 in a state where contact between the upper surface 2a of the laminate 2 and each of the first roller 11 and the second roller 12 is maintained. Specifically, the first roller 11 and the second roller 12 are moved such that a separation distance between the first roller 11 and the second roller 12 is larger than a diameter of the third roller 13.

In addition, as indicated by arrows in FIG. 2A, as the first roller 11 and the second roller 12 are moved, the third roller 13 is moved upward by the third moving portion 16. At this time, the first moving portion 14 and the second moving portion 15 restrict up and down movement of the first roller 11 and of the second roller 12. Accordingly, as shown in FIG. 2B, the laminate 2 is deformed to protrude upward by the amount of movement of the third moving portion 16. Specifically, the laminate 2 is deformed such that a recessed portion is formed in the upper surface 2a and a projecting portion is formed in the lower surface 2b.

The first moving portion 14, the second moving portion 15, and the third moving portion 16 move the first roller 11, the second roller 12, and the third roller 13 according to a signal from the control device.

In such a manner, the projecting portion that protrudes upward is formed at the end portion of the laminate 2 in the Y-axis direction.

Incidentally, in the above description, an example has been described in which when the laminate 2 is inserted into the gap between the third roller 13 and both the first roller 11 and the second roller 12 in the X-axis direction, the first roller 11 and the second roller 12 are disposed to be close to each other or to abut each other; however, the present invention is not limited thereto. For example, when the laminate 2 is inserted, the first roller 11 and the second roller 12 may be separated from each other by a predetermined distance (length larger than the diameter of the third roller 13). In this case, after the laminate 2 is inserted into the gap between the third roller 13 and both the first roller 11 and the second roller 12 in the X-axis direction, the third roller 13 is moved upward without the first roller 11 and the second roller 12 being moved in the X-axis direction. Even in such a manner, as shown in FIG. 2B, the laminate 2 can be deformed such that a recessed portion is formed in the upper surface 2a and a projecting portion is formed in the lower surface 2b.

Figure 3:
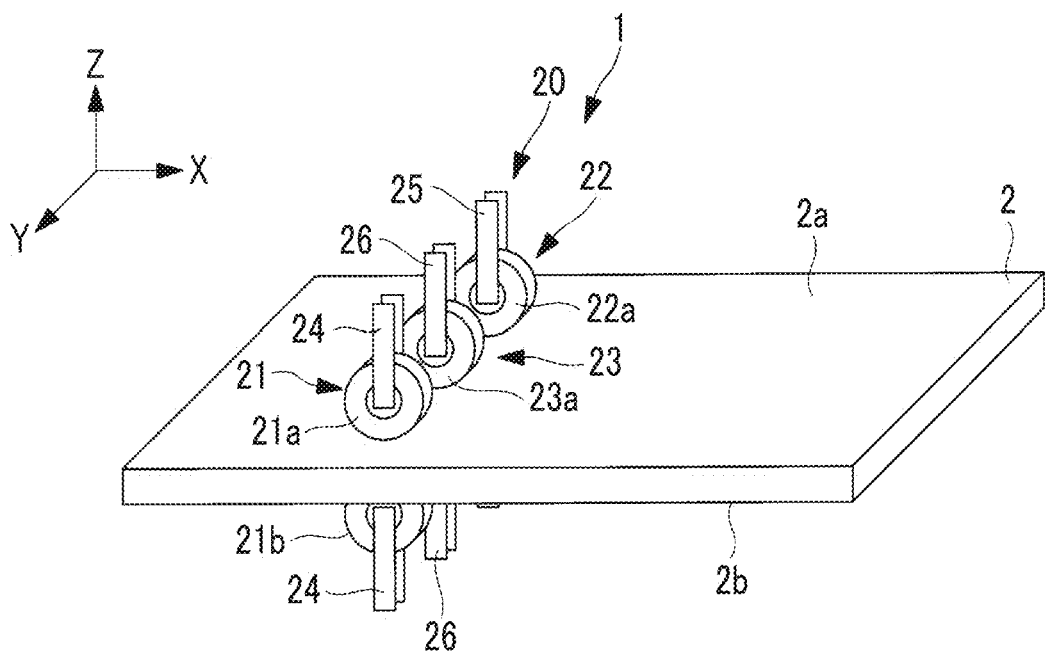
FIG. 3 is a schematic perspective view showing the laminate and rollers according to the present embodiment.

Next, the second processing device 20 will be described. As shown in FIG. 3, the second processing device 20 includes a first roller unit 21, a second roller unit 22, and a third roller unit 23 that sandwich the laminate 2 in the up-down direction. The first roller unit 21, the second roller unit 22, and the third roller unit 23 are disposed side by side in the Y-axis direction. In addition, the second processing device 20 includes a first support portion 24 that supports the first roller unit 21, a second support portion 25 that supports and moves the second roller unit 22 in the Z-axis direction, a fourth moving portion 26 that supports the third roller unit 23, and a control device (not shown) that controls the fourth moving portion 26.

The first roller unit 21 includes a first upper roller 21a that comes into contact with the upper surface 2a of the laminate 2, and a first lower roller 21b that comes into contact with the lower surface 2b of the laminate 2. Each of the first upper roller 21a and the first lower roller 21b is a rotating body having a cylindrical outer peripheral surface, and rotates around a central axis extending in the Y-axis direction. The first upper roller 21a and the first lower roller 21b are disposed such that the outer peripheral surfaces thereof face each other with the laminate 2 sandwiched therebetween. The first upper roller 21a and the first lower roller 21b are supported by the first support portion 24 to be located at predetermined positions.

The second roller unit 22 includes a second upper roller 22a that comes into contact with the upper surface 2a of the laminate 2, and a second lower roller 22b that comes into contact with the lower surface 2b of the laminate 2. Each of the second upper roller 22a and the second lower roller 22b is a rotating body having a cylindrical outer peripheral surface, and rotates around a central axis extending in the Y-axis direction. The second upper roller 22a and the second lower roller 22b are disposed such that the outer peripheral surfaces thereof face each other with the laminate 2 sandwiched therebetween. The second upper roller 22a and the second lower roller 22b are supported by the second support portion 25 to be located at predetermined positions.

The third roller unit 23 includes a third upper roller 23a that comes into contact with the upper surface 2a of the laminate 2, and a third lower roller 23b that comes into contact with the lower surface 2b of the laminate 2. Each of the third upper roller 23a and the third lower roller 23b is a rotating body having a cylindrical outer peripheral surface, and rotates around a central axis extending in the Y-axis direction. The third upper roller 23a and the third lower roller 23b are disposed such that the outer peripheral surfaces thereof face each other with the laminate 2 sandwiched therebetween. The third upper roller 23a and the third lower roller 23b are supported by the fourth moving portion 26 to be located at predetermined positions.

The fourth moving portion 26 moves the third roller unit 23 (in detail, the third upper roller 23a and the third lower roller 23b) in the Z-axis direction (up-down direction) using a driving force from a driving source (not shown).

The control device controls the fourth moving portion 26 such that the third roller unit 23 makes a predetermined movement. In addition, the fourth moving portion 26 is controlled to adjust the amount of movement of the third roller unit 23. Incidentally, since a detailed configuration of the control device provided in the second processing device 20 is substantially the same as that of the control device provided in the first processing device 10, a detailed description thereof will be omitted. Incidentally, the control device provided in the second processing device 20 and the control device provided in the first processing device 10 may be the same control device.

Next, a method for forming a recessed portion or a projecting portion in the laminate 2 using the second processing device 20 will be described with reference to FIGS. 4A and 4B.

Figure 4A:
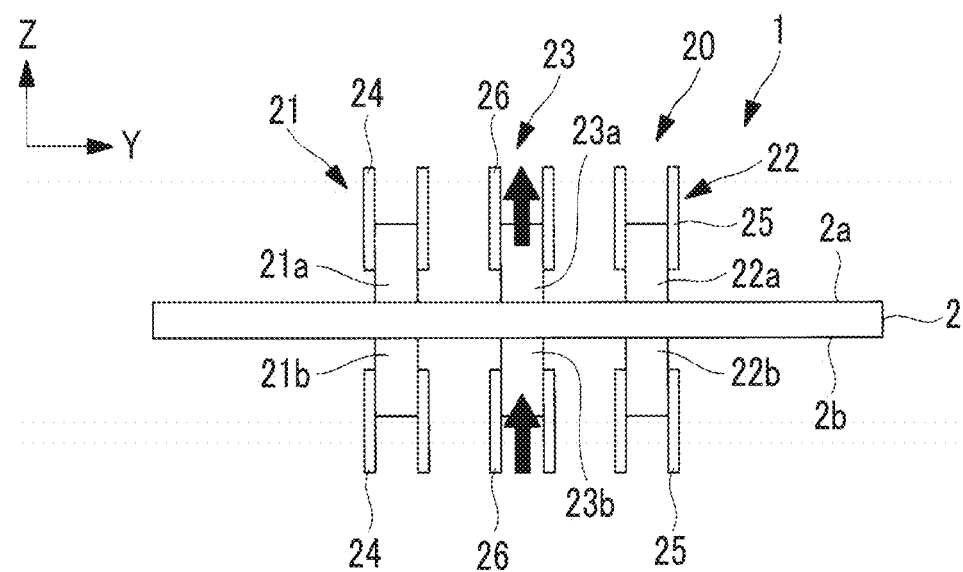
FIG. 4A is a schematic front view showing the laminate and the rollers according to the present embodiment, and is a view showing a method for forming a projecting portion in the laminate.
Figure 4B:
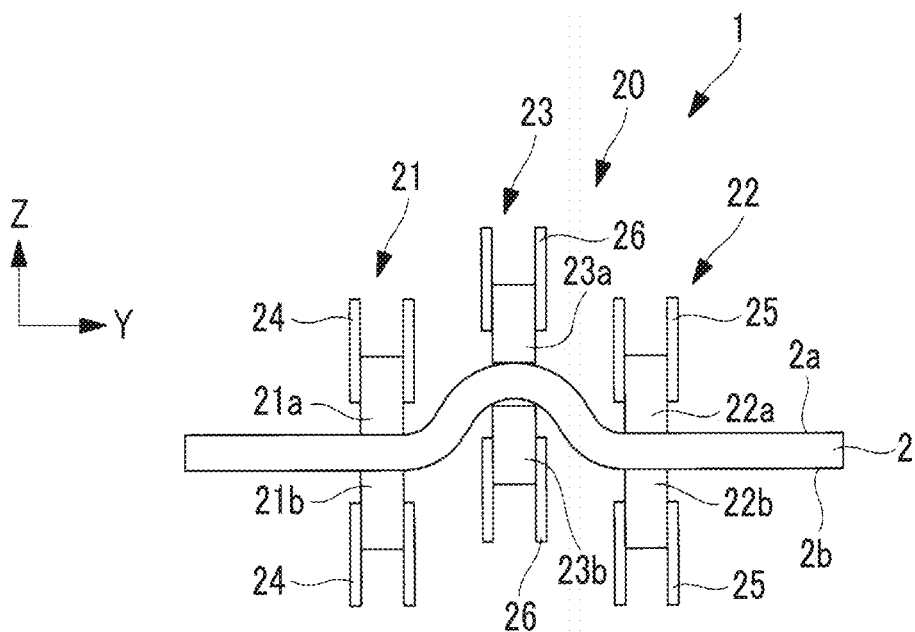
FIG. 4B is a schematic front view showing the laminate and the rollers according to the present embodiment, and is a view showing the method for forming the projecting portion in the laminate.

First, as shown in FIG. 4A, the laminate 2 is inserted into a gap between a group of the first upper roller 21a, the second upper roller 22a, and the third upper roller 23a and a group of the first lower roller 21b, the second lower roller 22b, and the third lower roller 23b in the X-axis direction. Then, the first upper roller 21a, the second upper roller 22a, and the third upper roller 23a are brought into contact with the upper surface 2a of the laminate 2, and the first lower roller 21b, the second lower roller 22b, and the third lower roller 23b are brought into contact with the lower surface 2b of the laminate 2. Namely, the laminate 2 is sandwiched between the first roller unit 21, the second roller unit 22, and the third roller unit 23. In detail, the first roller unit 21, the second roller unit 22, and the third roller unit 23 sandwich the central portion of the laminate 2 in the Y-axis direction.

Next, as indicated by arrows in FIG. 4A, the third roller unit 23 is moved upward by the fourth moving portion 26. At this time, the first support portion 24 and the second support portion 25 restrict up and down movement of the first roller unit 21 and of the second roller unit 22. Accordingly, as shown in FIG. 4B, the laminate 2 is deformed to protrude upward by the amount of movement of the fourth moving portion 26. Specifically, the laminate 2 is deformed such that a recessed portion is formed in the upper surface 2a and a projecting portion is formed in the lower surface 2b.

As the laminate 2 is deformed, a force to deform the lower surface 2b to protrude downward acts on regions adjacent to a region that the third roller unit 23 abuts, but since the first roller unit 21 and the second roller unit 22 provided adjacent to the third roller unit 23 sandwich the laminate 2 in the up-down direction, the deformation to protrude downward can be suppressed.

The fourth moving portion 26 moves the third roller unit 23 according to a signal from the control device.

In such a manner, the projecting portion that protrudes upward is formed at the central portion of the laminate 2 in the Y-axis direction.

Next, a method for manufacturing a composite structure according to the present embodiment will be described.

First, the laminate 2 made of a composite material and having a plate shape is formed by laminating a plurality of fiber reinforcing resin sheets (lamination step). Next, as for the laminate 2 having a plate shape, a recessed portion and a projecting portion are formed in the laminate 2 by the recess and projection processing device 1 (pressing deformation step). Next, the laminate 2 is deformed in the lateral direction such that a cross section in the longitudinal direction has a predetermined shape (lateral deformation step). In addition, the laminate 2 is deformed in the longitudinal direction such that a cross section in the lateral direction has a predetermined shape (longitudinal deformation step). In such a manner, the composite structure is manufactured. In the pressing deformation step, the recessed portion and the projecting portion are formed to include portions to be curved or bent in the longitudinal deformation step.

Next, a specific method for manufacturing a composite structure will be described. In the present embodiment, as one example, a method for manufacturing a composite structure 30 shown in FIG. 5A or a composite structure 40 shown in FIG. 6A will be described.

First, the method for manufacturing the composite structure 30 shown in FIG. 5A will be described.

The composite structure 30 is a long member in which a predetermined cross-sectional shape is provided to a cross section of the long member in the longitudinal direction (X-axis direction). In addition, the composite structure 30 is bent at two locations in the longitudinal direction. Namely, a predetermined cross-sectional shape is also provided to a cross section of the composite structure 30 in the lateral direction (Y-axis direction).

In detail, the cross-sectional shape of the composite structure 30 in the longitudinal direction includes a pair of flange portions 31 that are disposed at both ends in the Y-axis direction to extend in the Y-axis direction, a pair of web portions 32 extending diagonally inward from inner end portions of the flange portions 31 in the Y-axis direction, and a cap portion 33 that connects inner end portions of the pair of web portions 32.

In addition, the composite structure 30 integrally includes one end portion 34 that is one end side in the longitudinal direction, the other end portion 35 that is the other end side in the longitudinal direction, and a central portion 36 that connects the one end portion 34 and the other end portion 35. The one end portion 34, the other end portion 35, and the central portion 36 have substantially the same length in the longitudinal direction. The one end portion 34 and the central portion 36 are connected to each other in a bent shape to form a predetermined angle in a cross section in the lateral direction. Hereinafter, a connecting portion between the one end portion 34 and the central portion 36 is referred to as a first bent portion 37a. At the first bent portion 37a, an angle formed by plate surfaces on one side of the laminate 2 (lower surface 2b in the present embodiment) is an acute angle. The other end portion 35 and the central portion 36 are connected to each other in a bent shape to form a predetermined angle in a cross section in the lateral direction. Hereinafter, a connecting portion between the other end portion 35 and the central portion 36 is referred to as a second bent portion 37b. At the second bent portion 37b, an angle formed by plate surfaces on the other side of the laminate 2 (upper surface 2a in the present embodiment) is an acute angle. Namely, the composite structure 30 has a shape in which the one end portion 34 and the other end portion 35 are offset in a predetermined direction (Z-axis direction in the present embodiment) and the one end portion 34 and the other end portion 35 are connected to each other by the central portion 36.

The composite structure 30 having such a shape is manufactured by the following method.

First, the laminate 2 made of a composite material and having a plate shape is formed by laminating a plurality of fiber reinforcing resin sheets (lamination step).

Next, the pressing deformation step will be described in detail. Incidentally, hereinafter, an example will be described in which a recessed portion 38 is formed by the first processing device 10; however, when the recessed portion 38 is formed by the first processing device 10, the first processing device 10 is used upside down from the above description. Namely, the third roller 13 presses the laminate 2 from above to form the recessed portion 38.

Figure 5A:
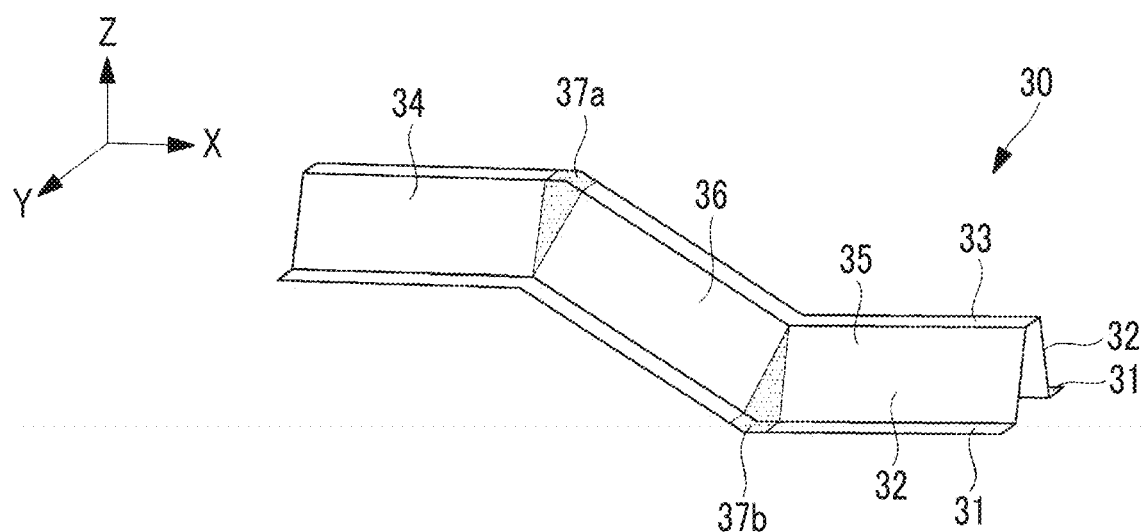
FIG. 5A is a schematic perspective view showing one example of a composite structure according to the present embodiment.
Figure 5B:
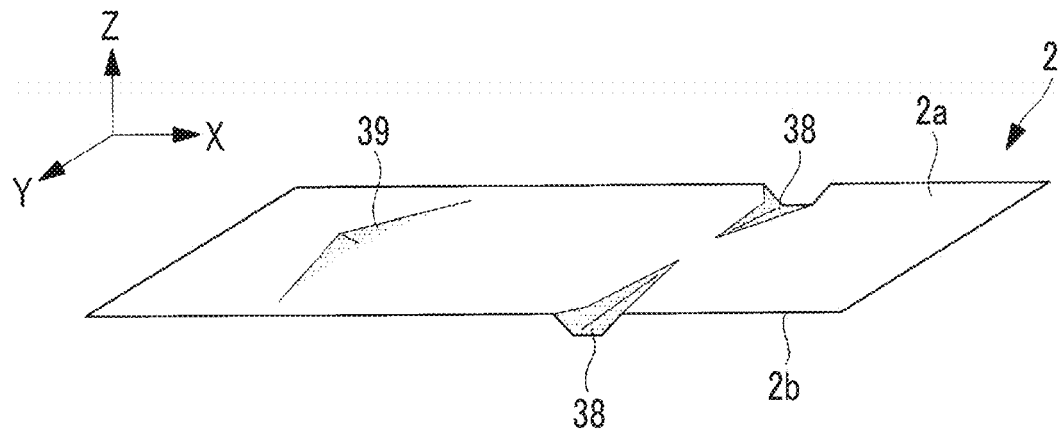
FIG. 5B is a schematic perspective view showing a state of the composite structure of FIG. 5A before a cross-sectional shape in a longitudinal direction is provided to the composite structure.

In the pressing deformation step, as shown in FIG. 5B, two recessed portions 38 are formed in predetermined portions of the laminate 2 having a plate shape by the first processing device 10. The predetermined portions are portions that serve as the second bent portion 37b after the longitudinal deformation step is performed (vicinity of one third from the other end of the laminate 2 in the X-axis direction), and are both end portions of the laminate 2 in the Y-axis direction. Each of the recessed portions 38 is recessed downward. In addition, each of the recessed portions 38 is formed such that the length in the X-axis direction is shortened and the depth is shallowed from the end portion toward a central portion in the Y-axis direction. In addition, the two recessed portions 38 are not connected to each other, and a flat surface exists between the two recessed portions 38. The flat surface serves as the cap portion 33 after the longitudinal deformation step is performed. In other words, the recessed portions 38 are formed at positions corresponding to the flange portion 31 and to the web portion 32 after the longitudinal deformation step is performed.

Next, a projecting portion 39 is formed in a predetermined portion of the laminate 2 having a plate shape by the second processing device 20. The predetermined portion is a portion that serves as the first bent portion 37a after the longitudinal deformation step is performed (vicinity of one third from one end of the laminate 2 in the X-axis direction), and is a central portion of the laminate 2 in the Y-axis direction. The projecting portion 39 protrudes upward. In addition, the projecting portion 39 is formed such that the length in the X-axis direction is shortened and the height decreases from the central portion toward both end portions in the Y-axis direction. The projecting portion 39 does not reach the end portion in the Y-axis direction, and a flat surface exists between the projecting portion 39 and the end portion in the Y-axis direction. The flat surface serves as the flange portion 31 after the longitudinal deformation step is performed. In other words, the projecting portion 39 is formed at a position corresponding to the cap portion 33 and to the web portion 32 after the longitudinal deformation step is performed.

When the recessed portions 38 and the projecting portion 39 are formed, the laminate 2 is taken out from the recess and projection processing device 1, and the lateral deformation step and the longitudinal deformation step are performed on the laminate 2.

In the lateral deformation step, the laminate 2 in which the recessed portions 38 and the projecting portion 39 are formed is deformed in the lateral direction to form the flange portions 31, the web portions 32, and the cap portion 33. In addition, in the longitudinal deformation step, the laminate 2 in which the recessed portions 38 and the projecting portion 39 are formed is deformed in the longitudinal direction to form the first bent portion 37a and the second bent portion 37b. Any means may be adopted as means for performing the lateral deformation step and the longitudinal deformation step. For example, the lateral deformation step and the longitudinal deformation step may be performed by pressing the laminate 2 against a mandrel corresponding to the shape of the composite structure 30 after completion. In this case, the lateral deformation step and the longitudinal deformation step are performed at the same time. In addition, a roll molding device may perform the longitudinal deformation step after the lateral deformation step is performed.

Figure 6A:
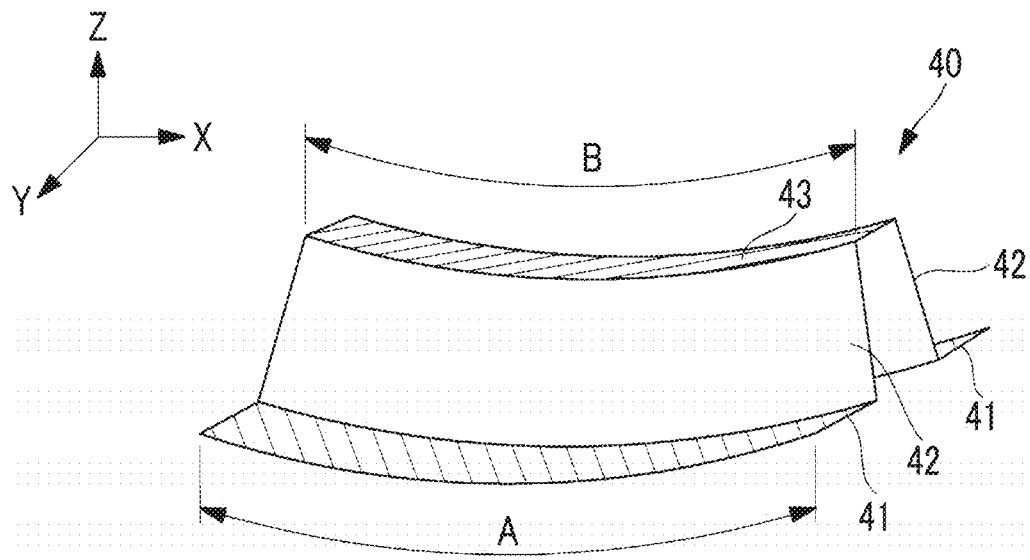
FIG. 6A is a schematic perspective view showing one example of a composite structure according to the present embodiment.

Next, the method for manufacturing the composite structure 40 shown in FIG. 6A will be described.

The composite structure 40 is a long member in which a predetermined cross-sectional shape is provided to a cross section of the long member in the longitudinal direction (X-axis direction). The cross-sectional shape of the composite structure 40 in the longitudinal direction shown in FIG. 6A includes a flange portion 41, a web portion 42, and a cap portion 43 substantially similarly to the cross-sectional shape of the composite structure 30 in the longitudinal direction shown in FIG. 5A.

In addition, the composite structure 40 is curved in an arch shape to form an arc in the longitudinal direction. In the present embodiment, the composite structure 40 is curved such that a radius of curvature of the cap portion 43 is smaller than a radius of curvature of the flange portion 41.

The composite structure 40 having such a shape is manufactured by the following method.

First, the laminate 2 made of a composite material and having a plate shape is formed by laminating a plurality of fiber reinforcing resin sheets (lamination step).

Figure 6B:
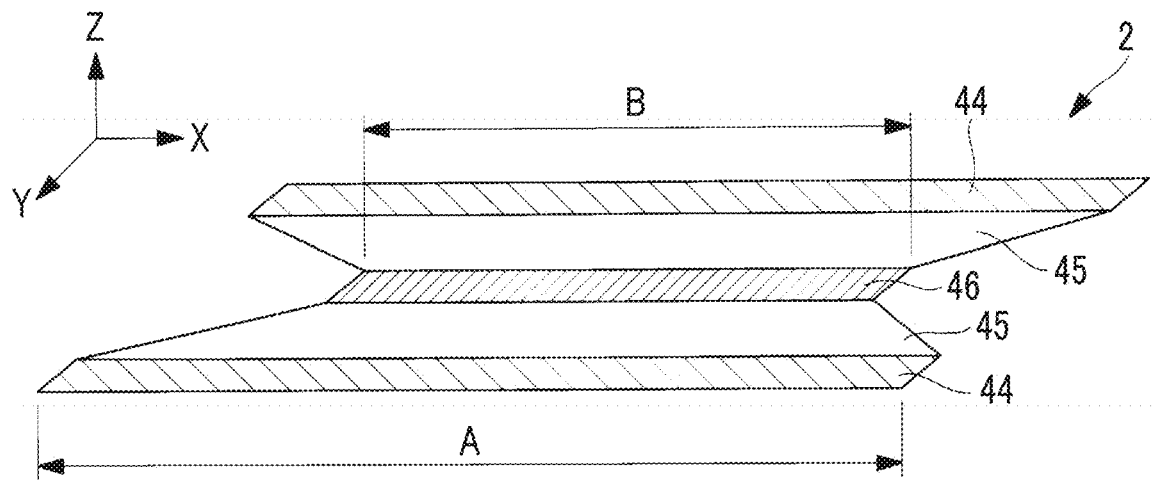
FIG. 6B is a schematic perspective view showing a state of the composite structure of FIG. 6A before a cross-sectional shape in the longitudinal direction is provided to the composite structure.

Next, the pressing deformation step will be described in detail. Incidentally, FIG. 6B is a view virtually showing a length of the laminate 2 in the X-axis direction in which a recessed portion and a projecting portion are formed in the pressing deformation step. Namely, FIG. 6B shows a state where the length of a portion in the X-axis direction in which the recessed portion or the projecting portion is formed is lengthened by the amount of detour of the recessed portion or the projecting portion. In addition, in FIG. 6B, a reference sign 44 is assigned to a portion corresponding to the flange portion 41 after the longitudinal deformation step is performed, a reference sign 45 is assigned to a portion corresponding to the web portion 42 after the longitudinal deformation step is performed, and a reference sign 46 is assigned to a portion corresponding to the cap portion 43 after the longitudinal deformation step is performed.

In the pressing deformation step, the projecting portion is formed in a predetermined portion of the laminate 2 having a plate shape by the first processing device 10 or by the second processing device 20. The predetermined portion is a region other than a central portion of the laminate 2 in the Y-axis direction, and is the entire region in the X-axis direction. In detail, the recessed portion or the projecting portion is formed in the portions corresponding to the flange portion 41 and to the web portion 42 after the longitudinal deformation step is performed.

The recess and projection processing device 1 continuously forms a plurality of the recessed portions or the projecting portions in the X-axis direction. As shown in FIG. 6B, in the portion corresponding to the flange portion 41 after the longitudinal deformation step is performed, the recessed portions or the projecting portions are formed to have the same length in the X-axis direction. In the portion corresponding to the web portion 42 after the longitudinal deformation step is performed, the recessed portion or the projecting portion is formed such that the length in the X-axis direction is lengthened toward an outer side in the Y-axis direction. As a method for adjusting the length in the X-axis direction, the length may be adjusted by changing the number of the recessed portions or the projecting portions to be formed, or the length may be adjusted by changing the depth or height of the recessed portion or the projecting portion to be formed.

Since the lamination step, the lateral deformation step, and the longitudinal deformation step are the same as those in the case of manufacturing the composite structure 30 of FIG. 5A, a detailed description thereof will be omitted.

In the present embodiment, the following effects are exhibited.

In the case of performing deformation in the longitudinal direction (X-axis direction) and deformation in the lateral direction (Y-axis direction) on the laminate 2, when the laminate 2 is deformed in the longitudinal direction (namely, a cross section in the lateral direction is deformed), a portion having a large radius of curvature and a portion having a small radius of curvature are generated depending on the position of a curved or bent portion in the lateral direction. For example, in the example of FIG. 6A, the radius of curvature of the cap portion 43 is smaller than the radius of curvature of the flange portion 41. A tensile force acts on the portion having a large radius of curvature in the longitudinal direction, and a compressive force acts on the portion having a small radius of curvature in the longitudinal direction.

In the present embodiment, before the laminate 2 is deformed in the lateral direction and in the longitudinal direction, the recessed portion or the projecting portion is formed in the predetermined portion of the laminate 2. When the recessed portion or the projecting portion is formed, the laminate 2 is deformed and elongated by the amount of detour of the recessed portion or the projecting portion. Hence, in a region including the portion in which the recessed portion or the projecting portion is formed, the length of the laminate 2 in the longitudinal direction is lengthened by the amount of detour of the recessed portion or the projecting portion. For example, in the example of FIG. 6A, the length of the portion in the longitudinal direction corresponding to the flange portion 41 in which the projecting portions are continuously formed (length A in FIG. 6B) is longer than the length of the portion in the longitudinal direction corresponding to the cap portion 43 in which the projecting portion is not formed (length B in FIG. 6B).

Therefore, when the laminate 2 is deformed in the longitudinal direction after the recessed portion or the projecting portion is formed, the tensile force generated in the portion having a large radius of curvature (flange portion 41 in the example of FIG. 6A) is suppressed by an amount by which the length of the laminate 2 in the longitudinal direction is lengthened. Since the tensile force generated in the portion having a large radius of curvature is suppressed, the compressive force acting on the portion having a small radius of curvature is also suppressed. Therefore, the generation of ripples or wrinkles can be suppressed. Hence, the strength of the composite structure can be improved.

In addition, in the present embodiment, the recessed portion or the projecting portion is formed in the laminate 2 by the rollers (first roller 11 and the like) that roll on the plate surface of the laminate 2. In addition, the movement distance or the like of each roller is adjusted by the control device. Accordingly, for example, the recessed portion or the projecting portion having a desired shape can be formed in the laminate 2 at a desired position by adjusting the position or pressing force of each roller. The shape of the recessed portion or the projecting portion formed in the laminate 2 having a plate shape varies depending on the shape of the composite structure (refer to FIGS. 5A to 6B), and with one recess and projection processing device 1 of the present embodiment, a composite structure of any shape can be dealt with. Hence, for example, the cost can be more suppressed as compared to a case where a recessed portion or a projecting portion that wants to be formed is formed in the laminate 2 using a mold prepared according to the position or shape of the recessed portion or the projecting portion.

In addition, in the present embodiment, the pressing deformation step, the lateral deformation step, and the longitudinal deformation step are performed on the laminate 2 in which the fiber reinforcing resin sheets are laminated. Accordingly, the time taken to manufacture the composite structure can be more shortened as compared to a case where the pressing deformation step, the lateral deformation step, and the longitudinal deformation step are performed on the fiber reinforcing resin sheets one by one, and then the fiber reinforcing resin sheets are laminated.

In addition, in the present embodiment, the recessed portion or the projecting portion is formed to include the portion to be curved or bent in the longitudinal deformation step. Accordingly, when the laminate 2 is deformed in the longitudinal direction, the tensile force generated in the portion having a large radius of curvature can be more favorably suppressed. Therefore, the compressive force acting on the portion having a small radius of curvature can be suppressed, and the generation of ripples or wrinkles can be more favorably suppressed. Hence, the strength of the composite structure can be more favorably improved.

Modification Example 1

Next, a modification example of the first embodiment will be described with reference to FIGS. 7A to 7C. The present modification example is different from the first embodiment in that a laminate 50 is formed in the lamination step such that the lengths of regions in the longitudinal direction including a predetermined portion forming a recessed portion or a projecting portion in the pressing deformation step are longer than the lengths of other regions in the longitudinal direction. The same configurations as those of the first embodiment are denoted by the same reference signs, and a detailed description thereof will be omitted.

Figure 7A:
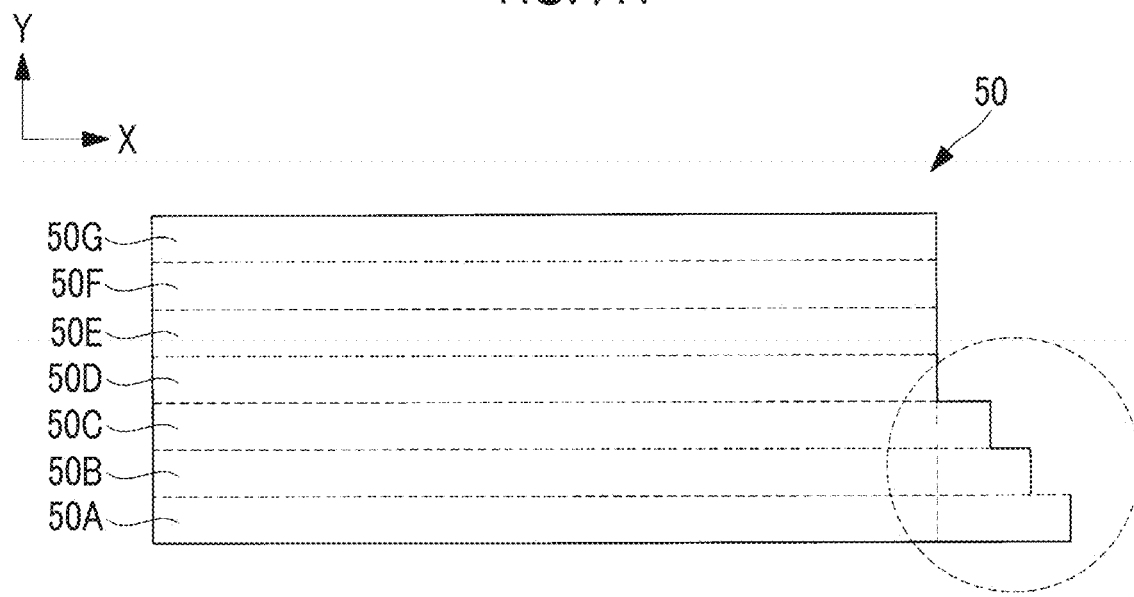
FIG. 7A is a schematic plan view of a laminate according to a modification example of the present embodiment.
Figure 7B:
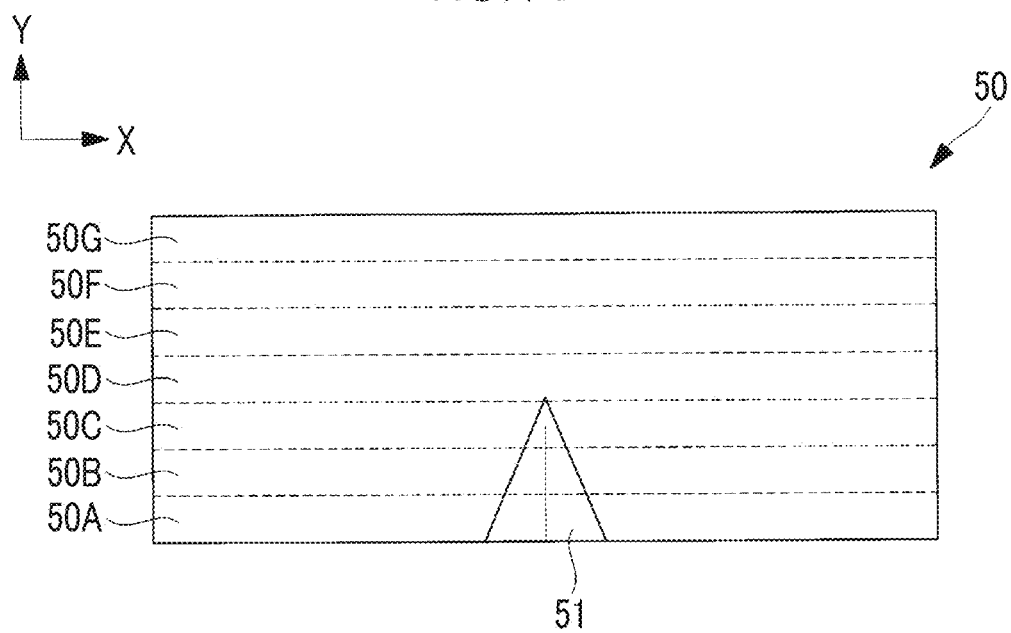
FIG. 7B is a schematic plan view showing a state where a projecting portion is formed in the laminate of FIG. 7A.
Figure 7C:
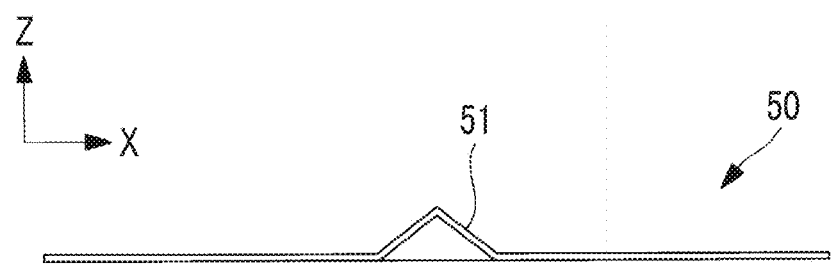
FIG. 7C is a schematic side view of the laminate of FIG. 7B.

In the present modification example, as shown in FIG. 7A, when the laminate 50 is conceptually divided into a plurality of regions (seven regions from a first region 50A to a seventh region 50G in the present modification example) in the Y-axis direction, the laminate 50 is formed such that the lengths of regions (from the first region 50A to the third region 50C) in the longitudinal direction including a predetermined portion forming a projecting portion 51 (refer to FIGS. 7B and 7C) in the pressing deformation step are longer than the lengths of other regions (from the fourth region 50D to the seventh region 50G) in the longitudinal direction in which the projecting portion 51 is not formed.

In the present modification example, the projecting portion 51 is formed such that the length in the X-axis direction is shortened and the height decreases from an end portion of the laminate 50 toward a central portion in the Y-axis direction. For this reason, a relationship between the lengths of the first region 50A to the third region 50C in the longitudinal direction is the first region 50A>the second region 50B>the third region 50C.

According to the present modification example, the following effects are exhibited.

In order to improve the strength of the laminate 50, the laminate 50 according to the present modification example in which a plurality of fiber reinforcing resin sheets are laminated is formed by laminating the fiber reinforcing resin sheets having different extending directions of fibers. The fiber reinforcing resin sheet is easy to elongate in a direction orthogonal to the fibers, and is difficult to elongate in the extending direction of the fibers. Hence, no matter what direction the laminate 50 is deformed, since the laminate 50 includes a fiber reinforcing resin sheet that is difficult to elongate, the laminate 50 is more difficult to deform than a laminate formed of one fiber reinforcing resin sheet.

Since the laminate 50 is difficult to deform in such a manner, the lengths of the regions (from the first region 50A to the third region 50C) in the longitudinal direction including the predetermined portion may not be able to be sufficiently lengthened only by the deformation (elongation) of the laminate 50. In the present embodiment, the laminate 50 is formed such that the lengths of the regions (from the first region 50A to the third region 50C) in the longitudinal direction including the predetermined portion forming the projecting portion 51 in the pressing deformation step are longer than the lengths of the other regions (from the fourth region 50D to the seventh region 50G) in the longitudinal direction. Accordingly, in the longitudinal deformation step, even when the lengths of the regions in the longitudinal direction including the predetermined portion cannot be sufficiently lengthened only by the deformation (elongation) of the laminate 50, an insufficient elongation amount can be covered by a portion that is formed to be longer than the other regions (portion indicated by a broken line circle in FIG. 7A). Therefore, the length of the region in the longitudinal direction including the predetermined portion can be sufficiently lengthened. Hence, it is possible to favorably suppress the generation of ripples or wrinkles even in the laminate that is difficult to deform.

Modification Example 2

A modification example of the first embodiment will be described with reference to FIGS. 8 and 9. The present modification example is different from the first embodiment in that a flexible film (flexible member) 60 is disposed between the rollers and the laminate 2. The same configurations as those of the first embodiment are denoted by the same reference signs, and a detailed description thereof will be omitted. Incidentally, an example will be described in which the film 60 is applied to the first processing device 10, but the film 60 may be applied to the second processing device 20.

Figure 8:
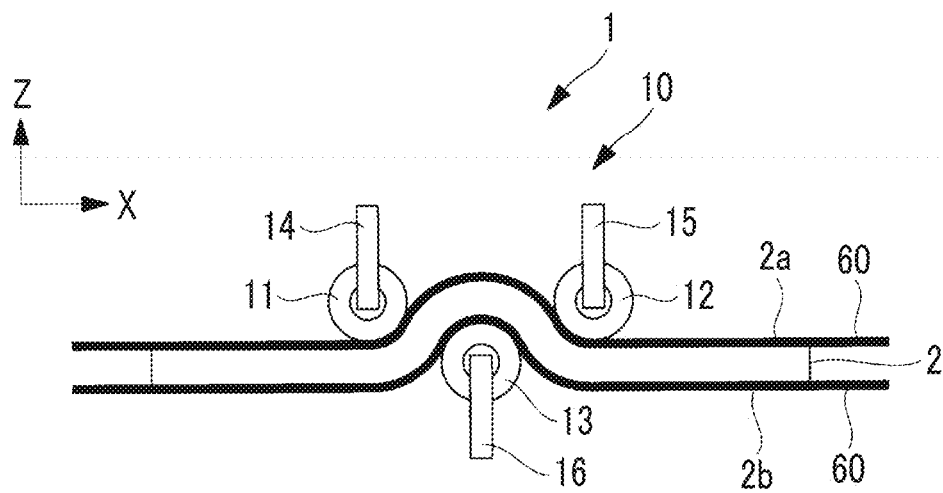
FIG. 8 is a schematic side view showing a laminate and rollers according to a modification example of the present embodiment.

As shown in FIG. 8, the films 60 of the present modification example cover the upper surface 2a and the lower surface 2b of the laminate 2. Accordingly, when the third roller 13 presses the laminate 2, the laminate 2 is pressed via the film 60.

According to the present modification example, the following effects are exhibited.

Figure 9:
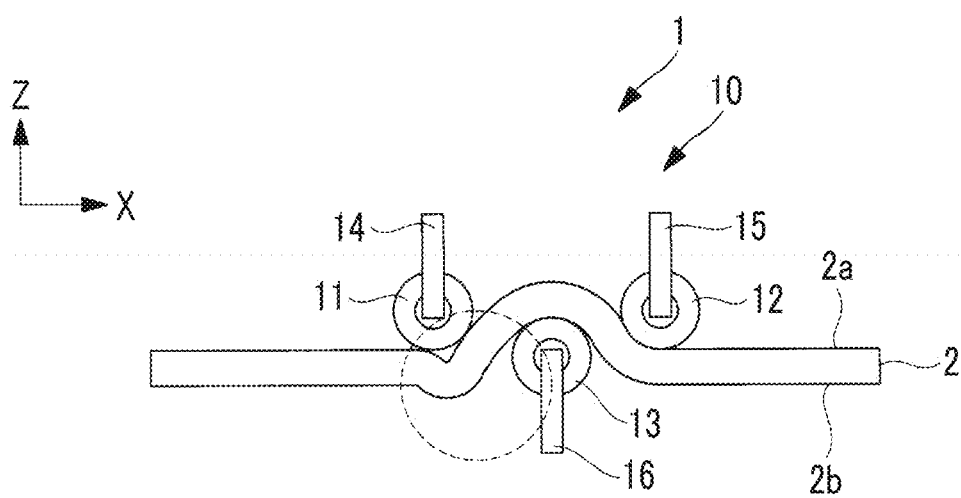
FIG. 9 is a schematic side view showing a comparative example of FIG. 8.

As shown in the comparative example of FIG. 9, when the film 60 is not provided, since a pressing force of each roller acting on the plate surface is locally increased, as indicated by a broken line circle in FIG. 9, unintended local deformation (deformation in an out-of-plane direction) may be generated.

In the present modification example, the third roller 13 presses the plate surfaces of the laminate 2 via the film 60. Accordingly, the film 60 is pressed against the plate surface by the pressing force of the third roller 13, and the film 60 is deformed into a shape corresponding to the plate surface. Therefore, the pressing force from each roller which acts on the plate surfaces of the laminate 2 is made uniform. Hence, unintended local deformation can be suppressed.

Modification Example 3

A modification example of the first embodiment will be described with reference to FIGS. 10A to 11. The present modification example is different from the first embodiment in that a track belt (flexible member) 61 is disposed between the rollers and the laminate 2. The same configurations as those of the first embodiment are denoted by the same reference signs, and a detailed description thereof will be omitted. Incidentally, hereinafter, an example will be described in which the track belt 61 is applied to the second processing device 20, but the track belt 61 may be applied to the first processing device 10.

Figure 10A:
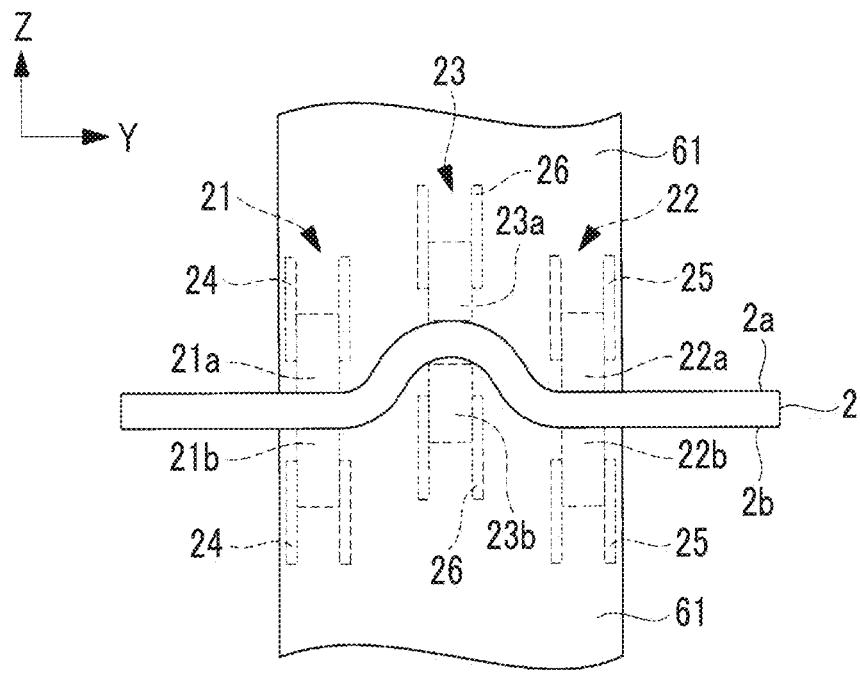
FIG. 10A is a schematic front view showing a laminate and rollers according to a modification example of the present embodiment.
Figure 10B:
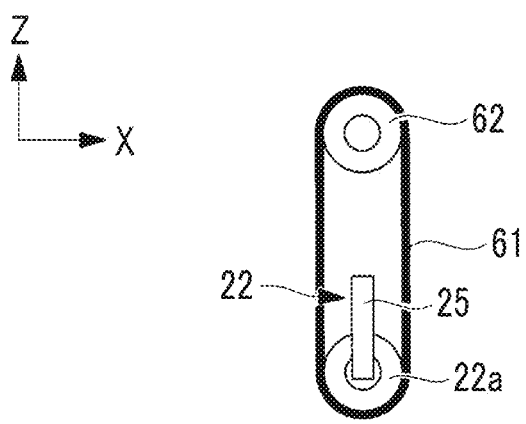
FIG. 10B is a schematic side view of the rollers of FIG. 10A.

In the present modification example, as shown in FIG. 10A, two track belts 61 are used. One track belt 61 covers the first upper roller 21a, the second upper roller 22a, and the third upper roller 23a. The other track belt 61 covers the first lower roller 21b, the second lower roller 22b, and the third lower roller 23b. As shown in FIG. 10B, each of the track belts 61 is held by each roller and by a pulley portion 62 disposed above or below each roller. Accordingly, as shown in FIG. 10A, when the third roller unit 23 presses the laminate 2, the laminate 2 is pressed via the track belt 61.

According to the present modification example, the following effects are exhibited.

Figure 11:
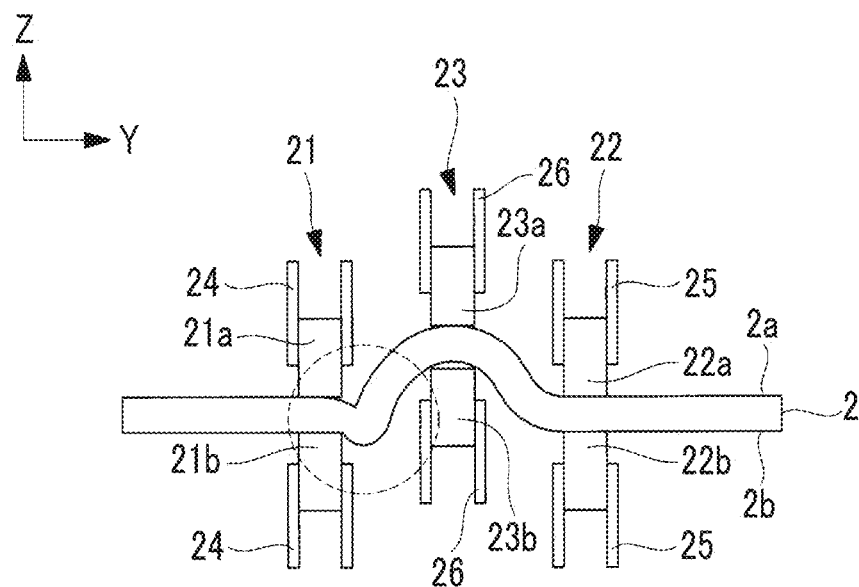
FIG. 11 is a schematic front view showing a comparative example of FIG. 10A.

As shown in the comparative example of FIG. 11, when the track belt 61 is not provided, since a pressing force of each roller acting on the plate surface is locally increased, as shown by a broken line circle in FIG. 11, unintended local deformation (deformation in the out-of-plane direction) may be generated.

In the present modification example, the third roller unit 23 presses the plate surface of the laminate 2 via the track belt 61. Accordingly, the track belt 61 is pressed against the plate surface by the pressing force of the third roller unit 23, and the track belt 61 is deformed into a shape corresponding to the plate surface. Therefore, the pressing force from each roller which acts on the plate surfaces of the laminate 2 is made uniform. Hence, unintended local deformation can be suppressed.

Incidentally, the present invention is not limited to the embodiment, and can be appropriately modified without departing from the concept of the present invention.

Figure 12:
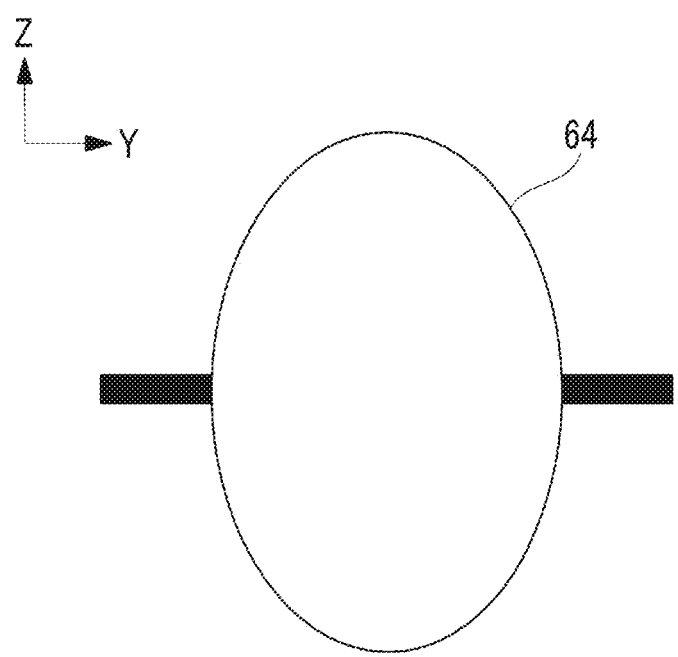
FIG. 12 is a schematic front view showing a roller according to a modification example of the present embodiment.
Figure 13:
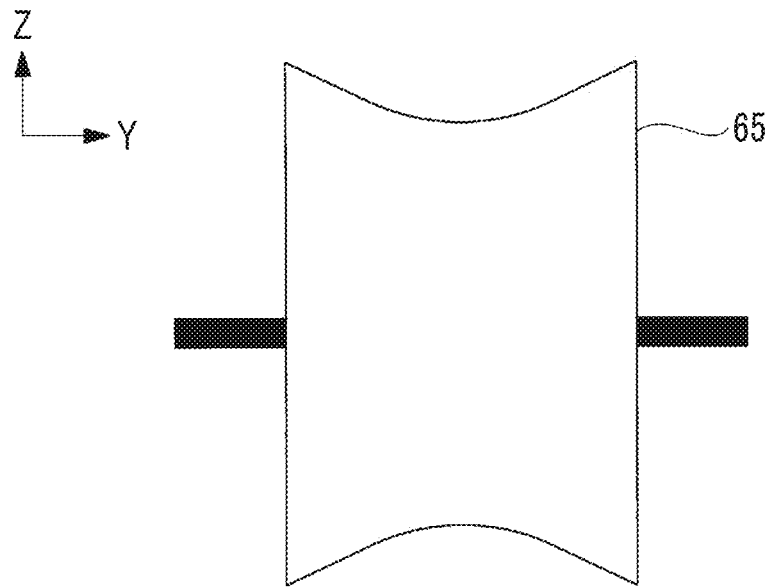
FIG. 13 is a schematic front view showing a roller according to a modification example of the present embodiment.

For example, in the embodiment, the case of using the rollers having a cylindrical shape has been described, but the present invention is not limited thereto. For example, as shown in FIG. 12, a roller 64 may be used in which a central portion in the Y-axis direction has a projecting shape when viewed in the X-axis direction. In addition, as shown in FIG. 13, a roller 65 may be used in which a central portion in the Y-axis direction has a recessed shape when viewed in the X-axis direction.

Figure 14:
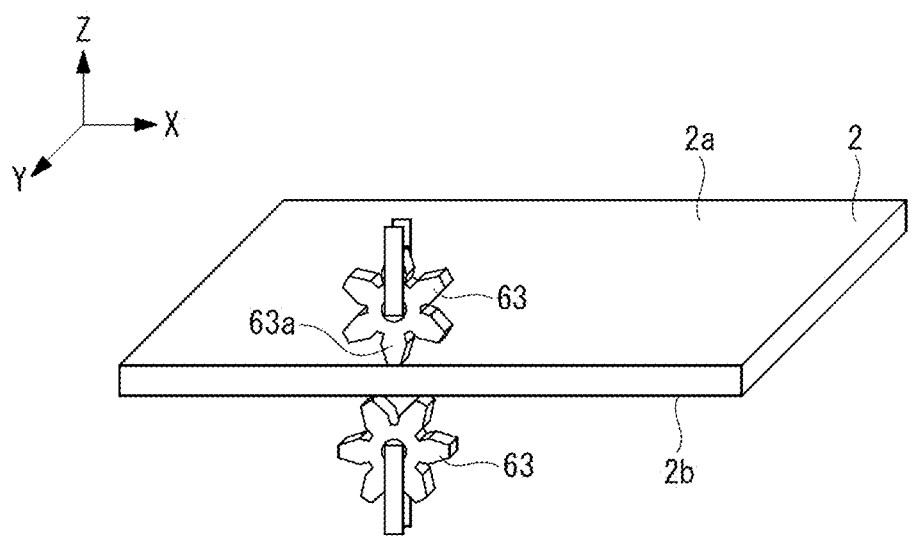
FIG. 14 is a schematic perspective view showing a laminate and rollers according to a modification example of the present embodiment.

In addition, as shown in FIG. 14, a gear (rotating body) 63 may be used instead of the rollers. The gear 63 includes a plurality of (six in the example of FIG. 14) protrusion portions 63a on an outer peripheral surface of the gear 63. In addition, when the gear 63 is applied, two gears 63 are disposed to face each other in the Z-axis direction. When the laminate 2 is inserted into a gap between the two gears 63, and the gears 63 are rotated, the protrusion portions 63a of the gears 63 press the plate surfaces of the laminate 2, and recessed and projecting portions are formed in the laminate 2. This process is continuously repeated, so that the laminate 2 has a wavy shape. In such a manner, the gear 63 is particularly effective when used to form continuous recesses and projections (for example, when used to form recesses and projections in the portion corresponding to the flange portion 41 in FIG. 6A). In addition, the shape of the gear is not limited. For example, the gear may be a spur gear in which teeth (protrusion portions) are substantially parallel to a central axis, may be a helical gear in which teeth are inclined with respect to a central axis, or may be a bevel gear in which a surface that comes into contact with the laminate 2 is inclined with respect to a central axis.

In addition, in the embodiment, an example has been described in which the laminate 2 has a flat plate shape, but the present invention is not limited thereto. The laminate 2 may have a plate shape and, for example, may be curved.

In addition, in the embodiment, an example has been described in which the recessed portion is formed by a roller of which the central axis is aligned with the Y-axis direction, but the present invention is not limited thereto. For example, the recessed portion may be formed by a roller of which a central axis is aligned with the X-axis direction. Namely, the roller may be applied in the lateral direction of the laminate 2.

In addition, in the embodiment, an example has been described in which the recessed portion or the projecting portion is formed by a plurality of rollers, but the present invention is not limited thereto. For example, the recessed portion or the projecting portion may be formed by a single roller. When the recessed portion or the projecting portion is formed by a single roller, a fixing mechanism is provided which fixes the laminate 2. The recessed portion or the projecting portion is formed by pressing the roller against the laminate 2 in a state where the movement of the laminate 2 in the thickness direction is restricted by the fixing mechanism.

In addition, the plurality of rollers may be made of a material having good mold releasability. Alternatively, a paint or the like having good mold releasability may be applied to the outer peripheral surfaces of the rollers. With such a configuration, it is possible to suppress a situation where the rollers and the laminate 2 adhere to each other.

In addition, the plurality of rollers may be made of a material having low slipperiness. Alternatively, a paint or the like having low slipperiness may be applied to the outer peripheral surfaces of the rollers. With this configuration, it is possible to suppress the slip of the rollers.

In addition, the rollers may include a transfer function. Namely, when the pressing deformation step and the lateral deformation step or the longitudinal deformation step are continuously performed, the laminate 2 may be transferred to a device that performs a next step, by a rotational force of the rollers.

In addition, the first processing device 10 may process the central portion of the laminate 2 in the Y-axis direction. In addition, the second processing device 20 may process the end portion of the laminate 2 in the Y-axis direction. Namely, processing device moving means may be provided which moves the first processing device 10 or the second processing device 20 to a predetermined position on the laminate 2. In addition, each of the first processing device 10 and the second processing device 20 may include an angle changing mechanism that changes the angle of the central axis of each roller.

In addition, the pressing deformation step may be performed continuously or intermittently.

Namely, for example, the laminate 2 may be continuously sent to the first processing device 10 or to the second processing device 20 from a device that performs other processing on the laminate 2. In other words, the laminate 2 may be sent to the first processing device 10 or to the second processing device 20 without stopping from another processing device. In addition, for example, the laminate 2 may be intermittently sent to the first processing device 10 or to the second processing device 20 from a device that performs other processing on the laminate 2. In other words, when the laminate 2 is sent from another processing device to the first processing device 10 or to the second processing device 20, the movement of the laminate 2 may be temporarily stopped, and processing may be performed on the laminate 2.

In addition, in the lamination step, when fiber reinforcing sheets are laminated, slits may be formed in some of the fiber reinforcing sheets to divide fibers. Namely, a slit may be formed in a fiber reinforcing sheet that is difficult to deform, to cut fibers. With such a configuration, the laminate 2 can be easily deformed.

In addition, the recess and projection processing device 1 may include a mechanism that pulls the laminate 2 from a downstream side of the first processing device 10 or the second processing device 20. With such a configuration, a tensile force can be applied to the laminate 2, so that the laminate 2 can be favorably deformed.

In addition, the recess and projection processing device 1 may include position measurement equipment such as laser measurement equipment. The position measurement equipment measures the position of each roller with respect to the laminate 2. With such a configuration, the recessed portion or the projecting portion can be formed at a desired position.

In addition, the recess and projection processing device 1 may include a heating mechanism that heats the laminate 2. With such a configuration, the laminate 2 can be heated, so that the laminate 2 can be favorably deformed.

Figure 15:
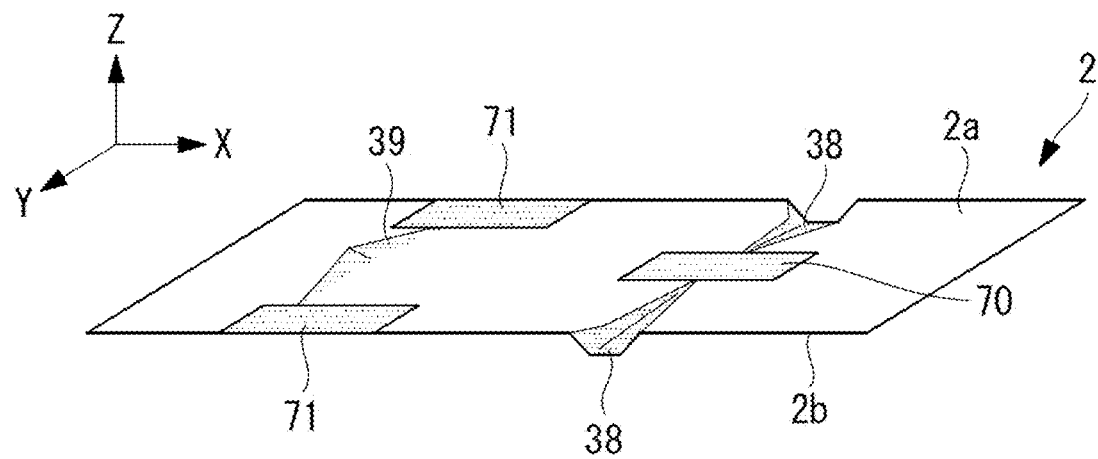
FIG. 15 is a schematic perspective view of a laminate for describing a modification example of the present embodiment.
Figure 16:
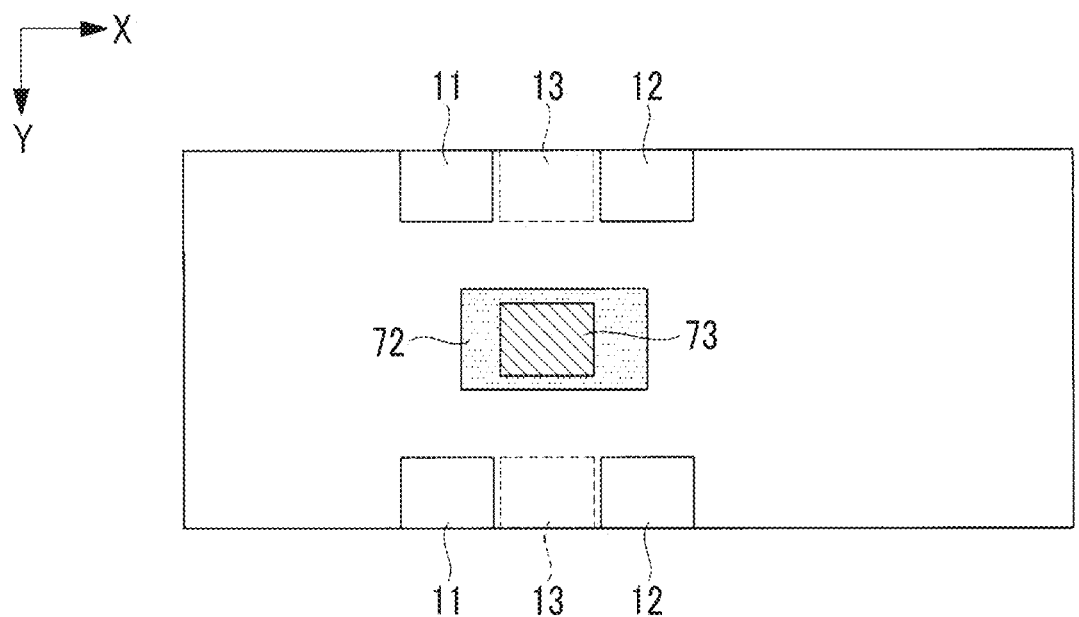
FIG. 16 is a schematic plan view showing a laminate according to a modification example of the present embodiment, and shows a state where a clamp mechanism clamps the laminate.
Figure 17:
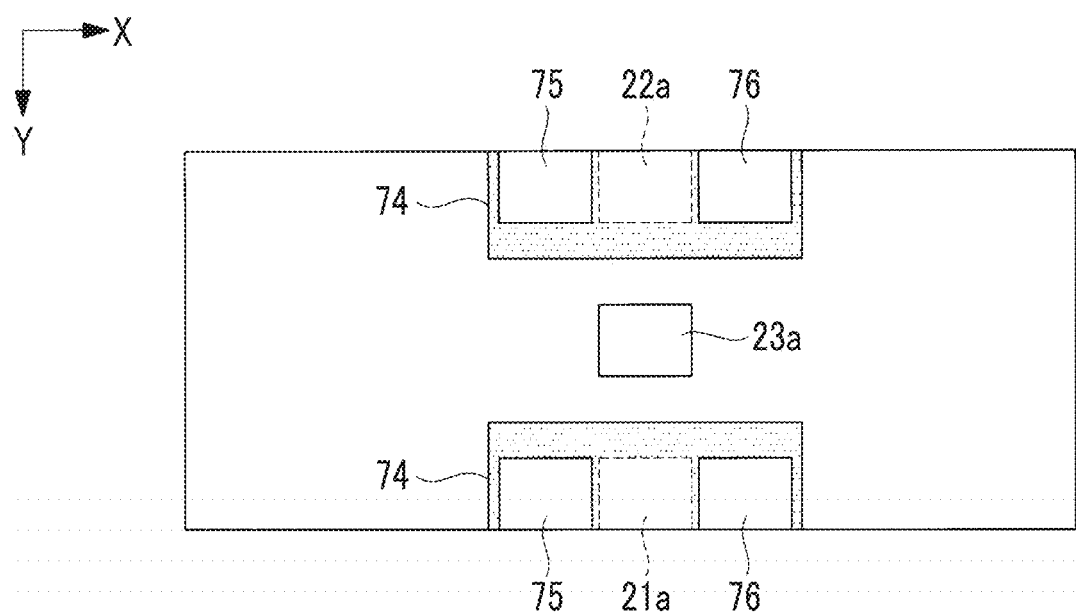
FIG. 17 is a schematic plan view showing a laminate according to a modification example of the present embodiment, and shows a state where a clamp mechanism clamps the laminate.

In addition, as shown in FIG. 15, when each of the recessed portions 38 is formed in the laminate 2, fibers may gather in a region 70 adjacent to the recessed portions 38, and wrinkles may be generated in the region 70. In addition, when the projecting portion 39 is formed, fibers may gather in each of regions 71 adjacent to the projecting portion 39, and wrinkles may be generated. On the other hand, when the recessed portion 38 or the projecting portion 39 is formed in the laminate 2, the region 70 or each of the regions 71 may be clamped by a clamp mechanism. With such a configuration, the generation of wrinkles in the region 70 or in each of the regions 71 can be suppressed. The clamp mechanism may be, for example, rollers or flat plates. Specifically, when the end portion of the laminate 2 in the lateral direction (Y-axis direction) is processed as shown in FIG. 1, as shown in FIG. 16, a clamp mechanism 73 is added which clamps a region 72 on the laminate 2. Accordingly, the generation of wrinkles in the region 72 can be suppressed. In addition, when the central portion of the laminate 2 in the lateral direction (Y-axis direction) is processed as shown in FIG. 3, as shown in FIG. 17, clamp mechanisms 75 and 76 are added which clamp regions 74 adjacent to the central portion in the Y-axis direction. Accordingly, the generation of wrinkles in each of the regions 74 can be suppressed.

The invention claimed is:

1. A composite structure manufacturing method comprising: a lamination step of forming a laminate having a plate shape by laminating a plurality of fiber reinforcing resin sheets; a pressing deformation step of forming a recessed portion or a projecting portion in a predetermined portion of the laminate by pressing a plate surface of the laminate with a rotating body that rolls along the plate surface of the laminate; a lateral deformation step of providing a predetermined shape to a cross section of the laminate in a longitudinal direction by deforming the laminate in a lateral direction after the pressing deformation step; and a longitudinal deformation step of providing a predetermined shape to a cross section of the laminate in the lateral direction by deforming the laminate in the longitudinal direction after the pressing deformation step.

2. The composite structure manufacturing method according to claim 1, wherein the predetermined portion forming the recessed portion or the projecting portion includes a portion to be curved or bent in the longitudinal deformation step.

3. The composite structure manufacturing method according to claim 1, wherein in the lamination step, the laminate is formed such that a length of a region in the longitudinal direction including the predetermined portion forming the recessed portion or the projecting portion in the pressing deformation step is longer than lengths of other regions in the longitudinal direction.

4. The composite structure manufacturing method according to claim 1, wherein in the pressing deformation step, a flexible member is disposed between the rotating body and the plate surface of the laminate, and the rotating body presses the plate surface of the laminate via the flexible member.

5. The composite structure manufacturing method according to claim 1, wherein the rotating body is movable in a thickness direction of the laminate.

6. The composite structure manufacturing method according to claim 1, wherein the rotating body includes a protrusion portion on an outer peripheral surface of the rotating body.

7. The composite structure manufacturing method according to claim 1, wherein in the pressing deformation step, a region adjacent to the recessed portion or to the projecting portion on the laminate is pressed from both surfaces of the laminate.

* * * * *